United States Patent
Kobayashi

(10) Patent No.: US 8,860,387 B2
(45) Date of Patent: Oct. 14, 2014

(54) BUCK-BOOST CONVERTER WITH IMPROVED EFFICIENCY OPERATION

(75) Inventor: Hidenori Kobayashi, Kawasaki (JP)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 508 days.

(21) Appl. No.: 12/928,876

(22) Filed: Dec. 22, 2010

(65) Prior Publication Data

US 2012/0146594 A1    Jun. 14, 2012

(30) Foreign Application Priority Data

Dec. 14, 2010  (EP) .................................... 10368047

(51) Int. Cl.
*H02M 3/158*   (2006.01)
(52) U.S. Cl.
CPC .................. *H02M 3/1582* (2013.01)
USPC ........................... 323/259; 323/282; 323/288
(58) Field of Classification Search
USPC ......... 323/259, 268, 271, 282, 284, 288, 344, 323/351; 363/39
See application file for complete search history.

(56) References Cited

U.S. PATENT DOCUMENTS

| | | | |
|---|---|---|---|
| 6,166,527 A | 12/2000 | Dwelley et al. | |
| 6,545,502 B1* | 4/2003 | Dasgupta et al. | 326/21 |
| 7,336,056 B1* | 2/2008 | Dening | 323/222 |
| 7,737,668 B2 | 6/2010 | Oswald et al. | |
| 7,863,872 B2 | 1/2011 | Chiu | |
| 2007/0252567 A1* | 11/2007 | Dearn et al. | 323/282 |
| 2008/0088292 A1 | 4/2008 | Stoichita et al. | |
| 2009/0108823 A1* | 4/2009 | Ho et al. | 323/282 |
| 2009/0309557 A1* | 12/2009 | Miyamae | 323/234 |
| 2010/0019745 A1* | 1/2010 | Keskar et al. | 323/271 |
| 2010/0148740 A1 | 6/2010 | Saitoh | |
| 2010/0231189 A1* | 9/2010 | Chen et al. | 323/284 |
| 2011/0074373 A1* | 3/2011 | Lin | 323/282 |
| 2011/0089915 A1* | 4/2011 | Qiu et al. | 323/271 |
| 2011/0187336 A1* | 8/2011 | Wu et al. | 323/282 |

FOREIGN PATENT DOCUMENTS

EP      2 009 776    12/2008

OTHER PUBLICATIONS

European Search Report—10368047.6-1242.
"A High Efficiency, Non-Inverting, Buck-Boost DC-DC Converter," by Mark Gaboriault et al., 2004 IEEE, 0-7803-8269-2/07, pp. 1411-1415.
"Analysis of PWM Nonlinearity in Non-Inverting Buck-Boost Power Converters," by Rajarshi Paul et al., 7 pgs.

* cited by examiner

*Primary Examiner* — Adolf Berhane
*Assistant Examiner* — Gustavo Rosario Benitez
(74) *Attorney, Agent, or Firm* — Saile Ackerman LLC; Stephen B. Ackerman

(57) ABSTRACT

Systems and methods for providing a buck-boost converter with an improved efficiency are disclosed. The buck-boost converter disclosed operates in 5 different modes, namely in buck mode, half frequency buck mode, half frequency buck-boost mode, half frequency boost mode, and in boost mode. In half frequency buck mode, buck-boost mode, and in half frequency boost mode the switching frequency is halved compared to the switching frequency of buck or boost mode. A simple circuit implementation by adding two offset voltages in ramp signals or PWM comparators enables to halve the switching frequency if required.

24 Claims, 8 Drawing Sheets

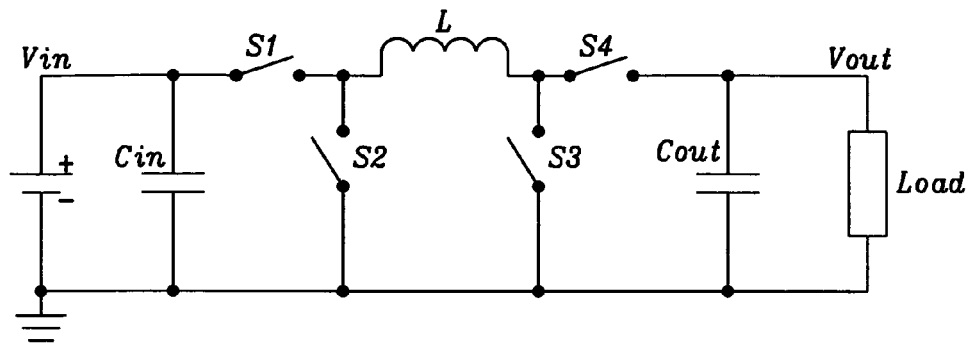
FIG. 1 – Prior Art
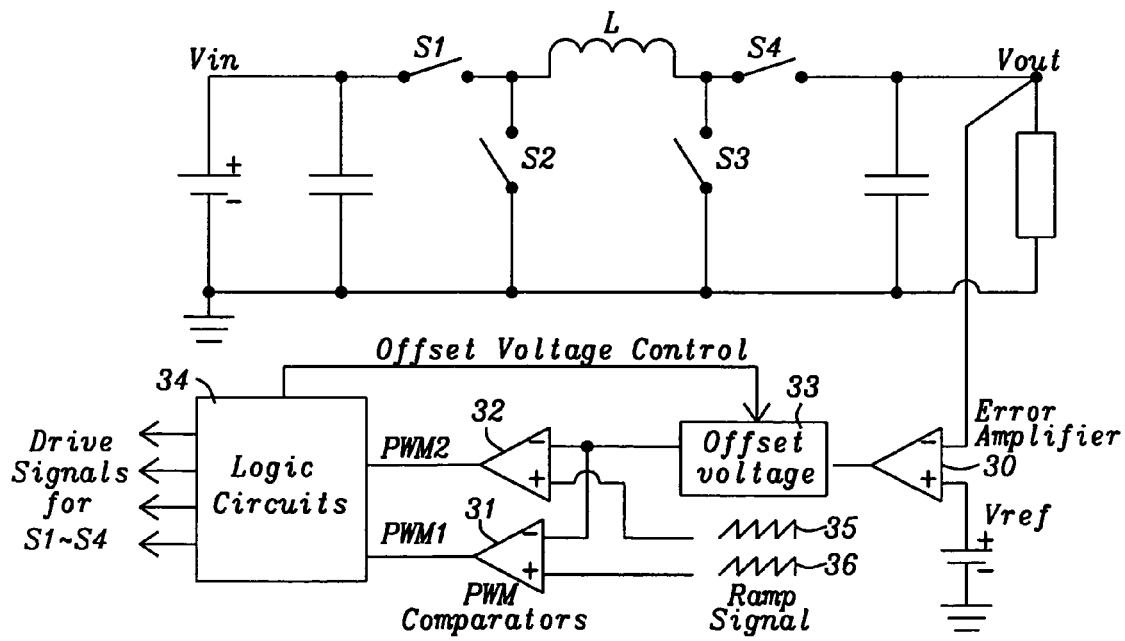
FIG. 2

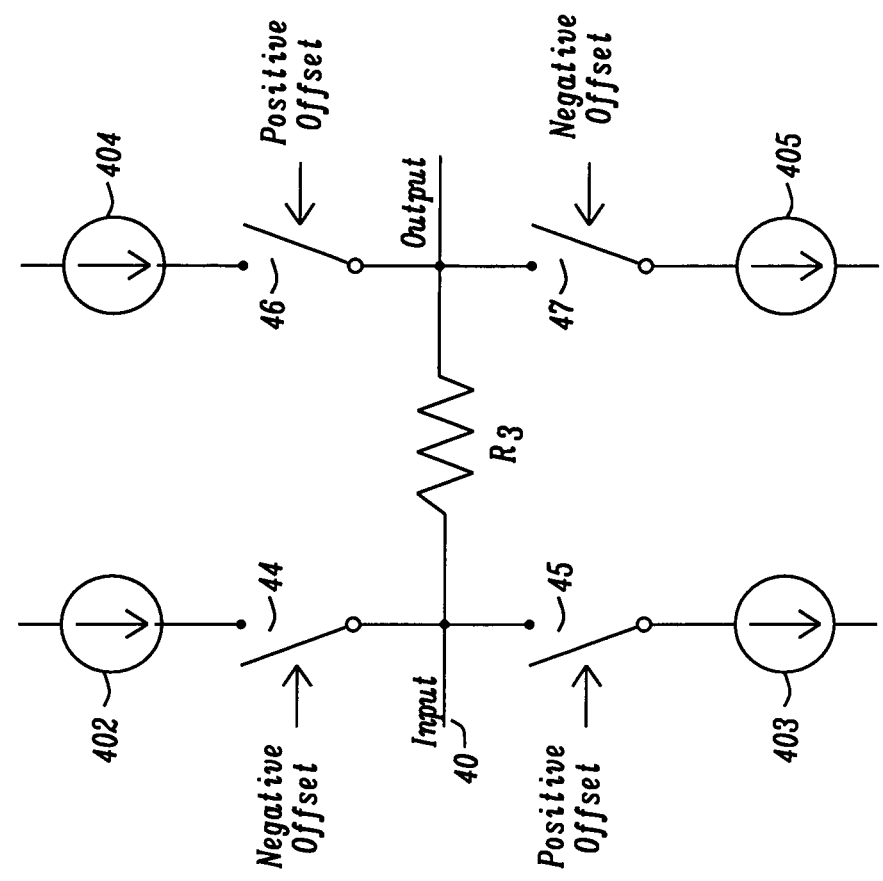
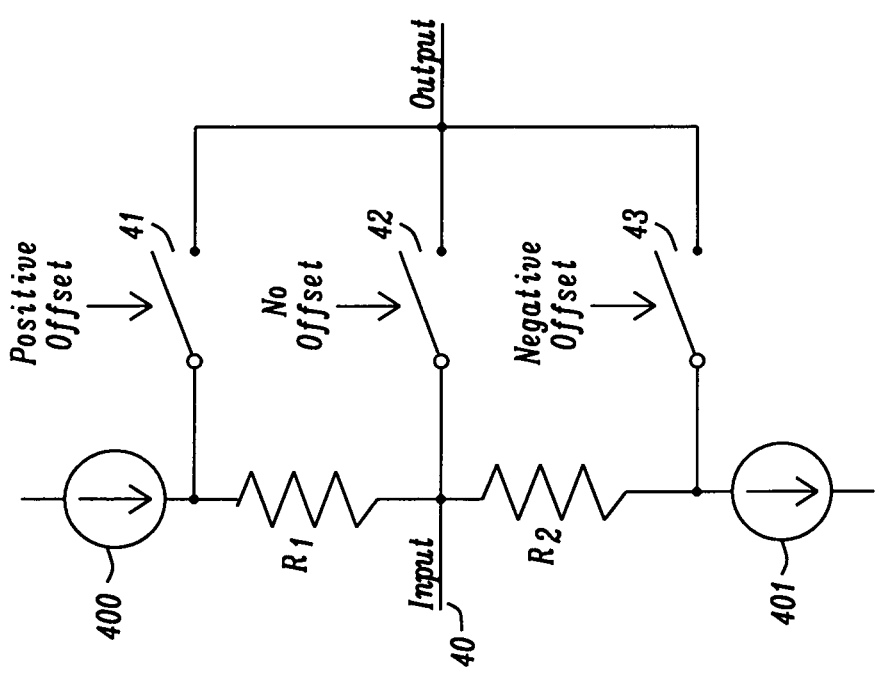
FIG. 4b
FIG. 4a

BUCK-BOOST CONVERTER WITH IMPROVED EFFICIENCY OPERATION

BACKGROUND (1) Field of the Invention

This invention relates generally to DC-to-DC converters and relates more specifically to non-inverted buck-boost switching regulators and control methods thereof.

(2) Description of the Prior Art

The buck-boost converter is a type of DC-DC converter that has an output voltage magnitude that is either greater than or less than the input voltage magnitude. It is a switch mode power supply with a similar circuit topology to the boost converter and the buck converter. The output voltage is adjustable based on the duty cycle of the switching transistor.

FIG. 1 prior art shows a non-inverted buck-boost switching regulator topology. Switches S1-S4 are usually realized by transistors.

while in the On-state, S1 and S3 are closed (on) and the input voltage source is connected to the inductor L. This results in accumulating energy in L. In this stage, the capacitor Cout supplies energy to the output load.

while in the Off-state, S2 and S4 are closed (on) and the inductor L is connected to the output load and capacitor Cout, so energy is transferred from L to Cout and Load.

Compared to the buck and boost converters, the characteristics of the buck-boost converter are mainly:

The output voltage can vary continuously from 0 to $-\infty$(for an ideal converter). The output voltage ranges for a buck and a boost converter are respectively 0 to $V_i$ and $V_i$ to $\infty$.

However, the lower conversion efficiency is the downside of the buck-boost converter. All four switches have to work all the time, whatever the input voltage is lower than the output voltage or higher than the output voltage. This increases the driving loss of switches and lowers the efficiency. In addition to this, the inductor current gets higher than in the buck or boost operation mode and increases the conduction loss of switches and the efficiency is further reduced.

U.S. patent (U.S. Pat. No. 6,166,527 to Dwelley et al., application Ser. No. 09/536,266) discloses a different control method to alleviate the above efficiency issue. In this method disclosed the buck-boost converter works in three different modes, namely in buck, boost or buck-boost mode. In buck mode S4 is always on and S3 is always off. This creates a buck topology in the buck-boost circuit and switches S1 and S2 are switching the same as a buck converter, when the input voltage is higher than the output voltage. In boost mode switch S1 is always on and switch S2 is always off, hence creating a boost topology. Switches S3 and S4 are switching and regulate the output voltage, when the input voltage is lower than the output voltage.

In buck-boost mode, all four switches are switching but use different PWM signals for the pair of S1 and S2 switches and the S3 and S4 pair in order to reduce the required inductor current. This control method improves the efficiency compared to the classical control method, but in the buck-boost mode all four switches have to work all the time at full frequency, so the driving loss is still high and reduces the efficiency in the buck-boost mode.

Another way to improve the efficiency of the buck-boost converter is, to remove the buck-boost operation from above invention. The converter only has buck mode and boost mode. When the input voltage is close to the output voltage, switches S1 and S4 are ON most of time, and switching intermittently occurs either in buck mode or boost mode. The drawback of this control method is that the output voltage regulation is poor, and frequency is not constant when input voltage and output voltage is close, and it may cause unwanted noise problems to the system. This method is called 'pulse skipping architecture.

It is a challenge for engineers to design high-efficient buck-boost converters, especially in conditions when the input voltage is close to the output voltage.

There are known patents or patent publications dealing with buck-boost converters.

U.S. Patent Publication (US 2010/0148740 to Saitoh) discloses a buck-boost regulator providing a stable, high-speed, high-efficiency constant voltage without a complicated, large-scale, high-cost phase compensation circuit over a wide range of operating conditions. This voltage buck-boost switching regulator consists of a pair of voltage reducing transistors, a pair of voltage boosting transistors, inductance coil, output capacitor, and controller. The controller has the following parts for performing PWM control of constant voltage for voltage reducing transistors and voltage boosting transistors: an output voltage feedback circuit, an inductor current sense circuit, a variable saw-tooth wave signal generator, switching controllers, and a voltage boosting driver.

U.S. Patent Publication (US 2009/0295343 to Chiu) discloses a buck-boost switching regulator, comprising: (1) a first loop including: a first and a second switch electrically connected with each other, the first switch having an end electrically connected with an input voltage, and the second switch having an end electrically connected with ground; and a first control circuit controlling the operation of the first and the second switch; (2) a second loop including: a third and a fourth switch electrically connected with each other, the third switch having an end electrically connected with ground, and the fourth switch having an end electrically connected with an output voltage; and a second control circuit controlling the operation of the third and the fourth switch; and (3) an inductor electrically connected between a node between the first and the second switch, and a node between the third and the fourth switch.

U.S. patent (U.S. Pat. No. 7,737,668 to Oswald et al.) proposes a buck-boost switching regulator which includes a first switch, a first diode, an inductor, a second switch, a second diode, and a controller for controlling the first switch and the second switch, the controller being configured to receive a current signal indicative of a inductor current flowing in the inductor, and generating a signal indicative of an average current flowing in the inductor, the average current being utilized to control the first switch and the second switch, wherein the controller includes a first compensator circuit for outputting a voltage error signal, a second compensator circuit for outputting a current error signal and a modulator circuit to output a first control signal to control the first switch and a second control switch to control the second switch.

SUMMARY

A principal object of the present invention is to improve the efficiency of non-inverted buck-boost converters.

A further object of the invention is to improve the efficiency of buck-boost converters especially when the input voltage is close to the output voltage while it maintains regulation performance.

A further object of the present invention is to keep the circuit design simple and at low cost.

In accordance with the objects of this invention a method to achieve a buck-boost converter system having an improved efficiency has been disclosed. The method disclosed comprises the following steps: (1) providing a buck-boost converter system comprising two PWM comparators, an error amplifier, a control circuit, and an offset voltage circuitry, (2) implementing five different operation modes of the buck-boost converter, wherein each of these five operation modes depends upon a dedicated relation of the input voltage to the output voltage, and (3) reducing switching frequency of the buck-boost converter in three operation modes wherein in these three operation modes the input voltage is closer to the output voltage than in the other operation modes.

In accordance with the objects of this invention a buck-boost converter system having an improved efficiency operation in five different operation modes has been disclosed. The buck-boost converter comprises, firstly: a DC voltage source, an input capacitor, deployed in parallel to the voltage source, four switches and an inductance arranged in a buck-boost topology, and said second switch, wherein its second terminal is connected to a second terminal of the input capacitor. Furthermore the buck-boost converter comprises an output capacitor, deployed in parallel to a load of the buck-boost converter, an output port loaded with an output voltage, which is connected to a control circuit of the converter, and said control circuit enabled to control the converter in five different operation modes wherein each of these five operation modes depends upon a dedicated relation of the input voltage to the output voltage.

BRIEF DESCRIPTION OF THE DRAWINGS

In the accompanying drawings forming a material part of this description, there is shown:

FIG. 1 prior art shows a non-inverted buck-boost switching regulator topology.

FIG. 2 illustrates a block diagram of a buck-boost converter of the present invention, which is enabled to operate in five different operation modes.

FIGS. 4 a-b illustrate two exemplary offset voltage circuits of the present invention.

Figure 3:
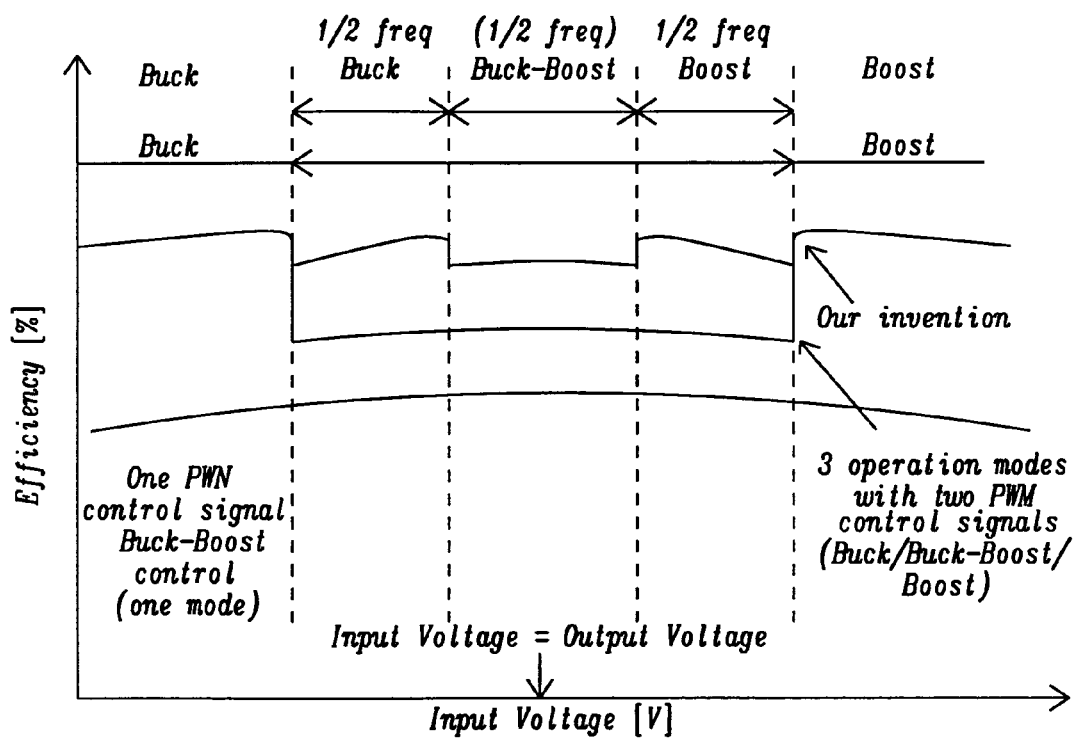
FIG. 3 shows the efficiency gains of the present invention compared to the classical buck-boost converter or to a 3 modes buck-boost control.

DESCRIPTION OF THE PREFERRED
EMBODIMENTS

Methods and circuits to improve the efficiency of buck-boost converters are disclosed.

In the control method invented, the buck-boost converter operation/control can be divided into 5 modes, which are buck, half frequency buck, buck-boost, half frequency boost, and boost mode. In another embodiment of the invention the buck-boost operation could also be divided in 3 modes, which are buck and boost mode in full frequency and buck-boost mode in halved frequency. This 3-mode operation will be outlined later.

FIG. 2 illustrates a block diagram of the buck-boost converter of the present invention, which is enabled to operate in five different operation modes.

In buck and half frequency buck mode, switch S3 is continuously off and switch S4 is continuously on and this creates a buck topology. The difference between buck and half frequency buck mode is the reduced switching frequency of the half frequency buck mode. In the half frequency buck mode the converter operates with half switching frequency compared to the buck mode. In boost and half frequency boost mode, switch S1 is continuously on and switch S2 is continuously off thus creating a boost topology. In half frequency boost mode the converter switches in half frequency compared to the boost mode.

In buck-boost mode, the pair of switches S1 and S2 and the pair of switches S3 and S4 are both switching with different PWM signals. The frequency is also half in the buck-boost mode compared to buck or boost mode. When the input and output voltage are close together, the switching frequency is reduced to half of the original frequency, so the driving loss of the switches is significantly reduced. It should be noted that this could also reduce the buck-boost operation range (condition).

Most of prior art buck-boost converters have physical pulse-width limits causing therefore a gap between buck and boost operation region. For example, if the minimum pulse width is 100 nsec at 1 MHz switching frequency, the minimum and the maximum duty cycle of PWM signals are 10% and 90%. At ideal condition, maximum output voltage in the buck mode is 90% of the input voltage, minimum output voltage in boost mode is 111% of the input voltage. Neither buck or boost mode can provide an output between about 90% and 111% of the input voltage. At this condition a buck-boost operation is required.

However, if the frequency can be reduced this limitation is alleviated. If the converter needs the output voltage higher than 90% of input voltage, it reduces, according to the method invented, the frequency to half of the original frequency. By reducing the frequency the possible range of pulse width gets significantly larger; e.g. 100 nsec minimum pulse width limitation, mentioned above, becomes 5% at 500 KHz, instead of 10% at 1 MHz. Therefore the buck mode can output up to 95% of input voltage, and the boost mode can output down to 105.3% of input voltage. Therefore, the buck-boost operation is only needed when the output voltage is between about 95% and 105.3% of input voltage. Since the efficiency is reduced in buck-boost operation, relative to the other modes, reducing the buck-boost operation region achieves overall higher efficiency.

In buck-boost mode, all switches are busy, but the frequency is only half and therefore the total driving loss does not increase, compared to the buck and boost mode.

FIG. 3 shows the efficiency gains of the present invention compared to the classical buck-boost converter or to a 3 modes buck-boost control. Classical one PWM control signal buck-boost control showed the lowest efficiency due to larger inductor current and larger driving loss. In 3 modes operation, only two switches are working in buck and boost mode, and inductor current is also the same as in the buck and boost mode of the present invention and therefore the efficiency is much improved compared to the one PWM buck-boost control signal. In buck-boost mode the efficiency of the 3 modes control is better than the one PWM control but significantly lower than in the ½ frequency buck, the (½ frequency) buck-boost, or in the ½ frequency boost control mode of the present invention.

In the 5 modes operation of the present invention, the half frequency buck and the half frequency boost operation reduces the buck-boost region and improves the efficiency as outlined above. Even in buck-boost operation the efficiency is still higher than the buck-boost operation of the 3 modes operation because of the lower frequency used and the lower driving loss.

Returning to FIG. 2 the control circuit deployed to achieve the control method of the present invention is also illustrated.

In a preferred embodiment the control comprises an error amplifier 30, an offset voltage circuitry 33, two ports providing two ramp signals 35 and 36, two PWM comparators 31 and 32, and a logic circuitry 34 driving the four switches S1-S4 of the buck-boost converter, and control offset voltage. The output voltage of the converter and a reference voltage are connected to the error amplifier 30 (including compensation circuit) generating an error signal. Two ramp signals 35 and 36 and two PWM comparators 31 and 32 generate the two kind of PWM signals for the buck switches S1 and S2 and for the boost switches S3 and S4.

In a preferred embodiment of the invention PWM comparator 31, receiving input from buck ramp signal 36 is used to control the switches in buck mode, while PWM comparator 32, receiving input from boost ramp signal 35 is used to control the switches in boost mode. Furthermore it should be noted that there is a difference between buck and boost ramp signals as illustrated in FIGS. 5a-5e. Boost ramp signals are set higher than the buck ramp signals, by this, appropriate buck and boost PWM signals are generated by the error amplifier output voltage position.

An offset voltage circuit 33 is added to the error amplifier 30 outputs. This offset voltage is controlled by logic circuitry 34 and provides three kinds of offsets, namely positive, zero, or negative offset. These offsets can be added to the error signal, i.e. the output of the error amplifier 30.

Two exemplary offset voltage circuits of are shown in FIGS. 4 a-b, and in practice, such an offset circuit can be implemented into PWM comparators, error amplifier, or ramp signal generator. The circuit of FIG. 4a shows a circuit wherein an arrangement of switches 41-43 directs currents from two current sources 400-401 over resistors R1 and R2 in order to exploit a suitable voltage drop on the resistors, or means of resistance, to generate positive, negative or no offset. Positive offset voltage is achieved by closing switch 41, zero offset is achieved by closing switch 42 and negative offset is achieved by closing switch 43. FIG. 4b shows a similar circuit requiring only one resistor R3, or means of resistance, to generate the offsets desired. Positive offset voltage is achieved by closing switches 45 and 46, zero offset is achieved by closing all switches 44-47 and negative offset is achieved by closing switches 44 and 47. The two ramp signals shown in FIG. 2 have to have a certain gap between them. The offset voltage should be slightly larger than this voltage gap between the two ramp signals.

The following algorithm controls the offset voltage:
When PWM1 (Buck PWM comparator output signal) has a pulse, positive offset is applied to the error signal in the next cycle.
When PWM1 has no pulse during one cycle, positive offset is removed in the next cycle.
When PWM2 (Boost PWM comparator output signal) has a pulse, negative offset is applied to the error signal in the next cycle.
When PWM2 has no pulse during one cycle, negative offset is removed in the next cycle.

FIGS. 5a-h show waveforms of each operation mode disclosed.

Figure 5A:
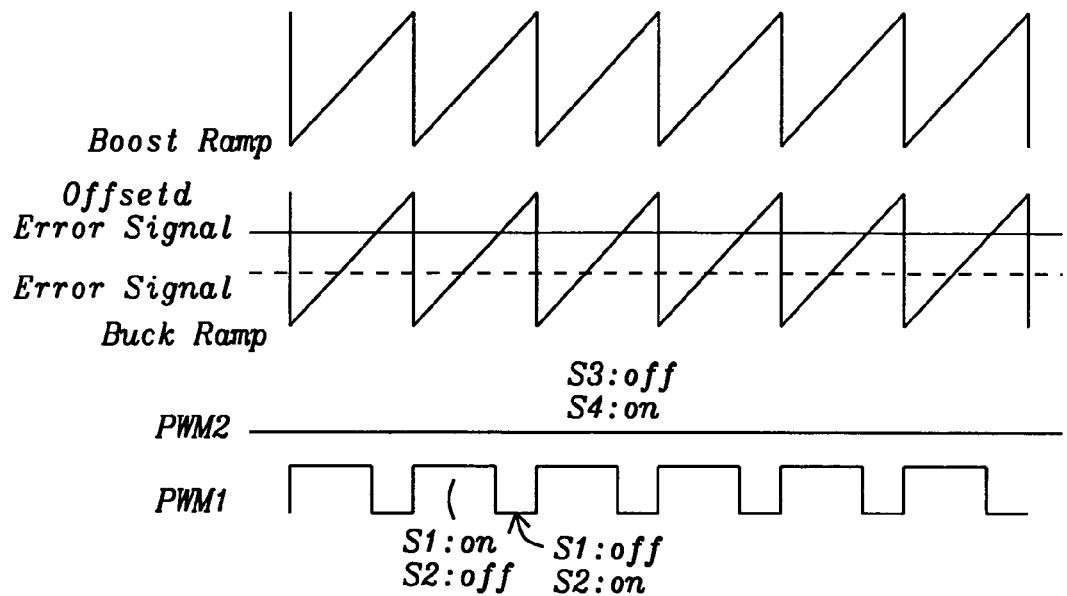
FIGS. 5 a-h show the waveforms of each of the operation modes disclosed.

FIG. 5a illustrates the waveforms of the buck mode. When the error signal is low enough, the buck signal is generated with the positive offset. The buck pulse is generated therefore all the time and the converter works as buck converter with full frequency.

Figure 5B:
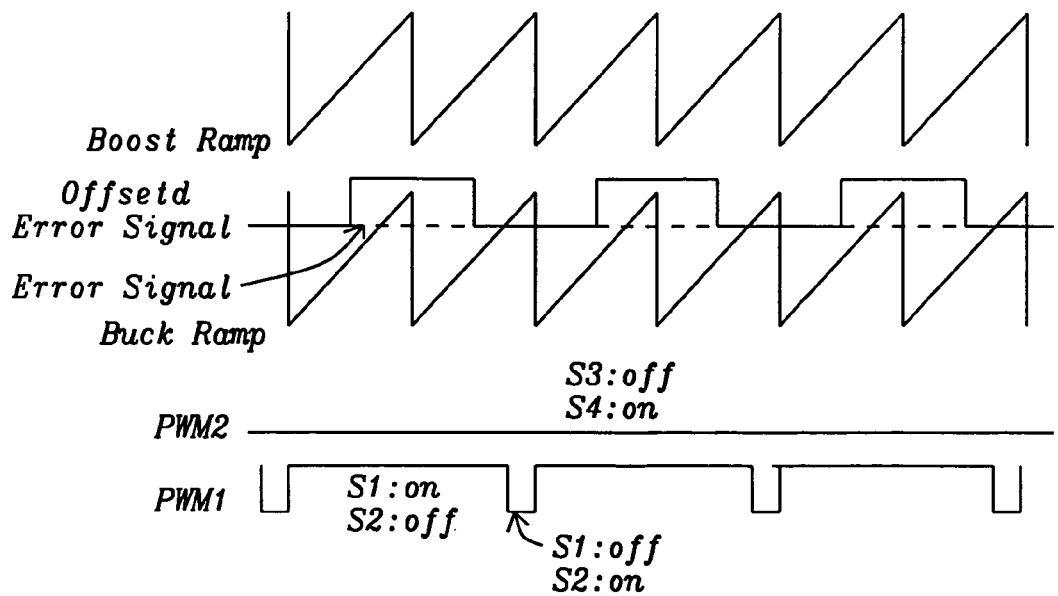

When the error signal gets higher than defined for the buck mode, the converter goes into half frequency buck mode as shown in FIG. 5b. At this error signal voltage, the buck pulse is not generated at all with the positive offset present, but the pulse is generated without positive offset. If the buck pulse is generated, the positive offset is applied and the buck pulse will be skipped into the next cycle. If the buck pulse is not generated (skipped), the positive offset will be removed and the buck pulse will be generated in the next cycle. This way a half frequency PWM signal is generated.

Figure 5C:
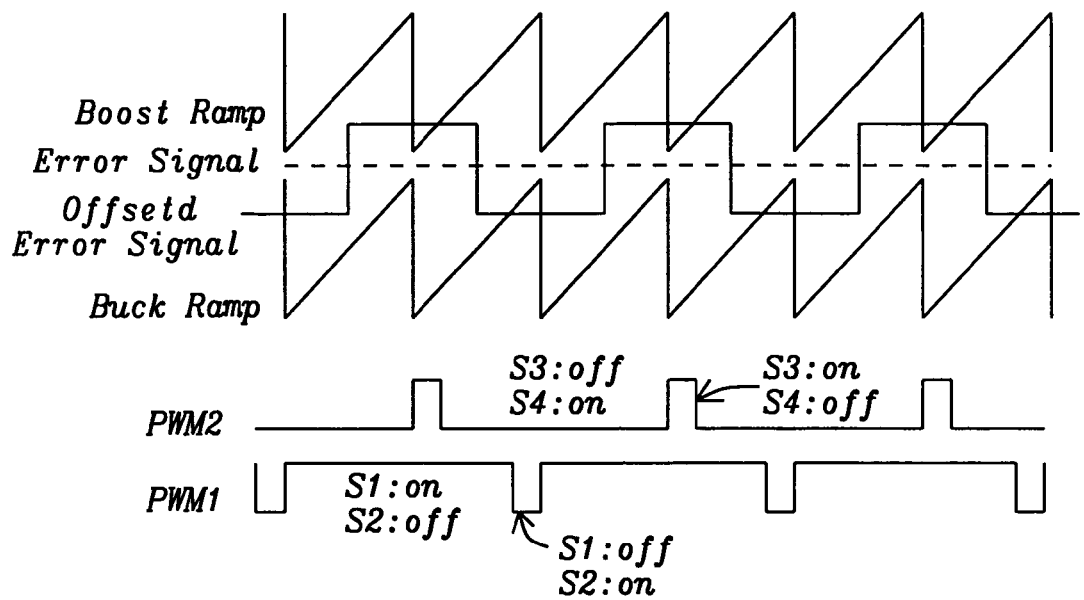

When the error signal gets higher than defined for the half frequency buck mode, the converter goes into the buck-boost mode as shown in FIG. 5c. At this buck-boost error signal voltage, the boost pulse is generated with the positive offset, and the buck pulse is generated with the negative offset. This situation can happen if the amount of each voltage offset is larger than the gap between the two ramp signals. If the buck pulse is generated, the positive offset is applied and the boost pulse is generated in the next cycle. If the boost pulse is generated the negative offset is applied and the buck pulse is generated in the next cycle. This way, the buck and boost switches work in turn and achieve a highly efficient buck-boost mode.

Figure 5D:
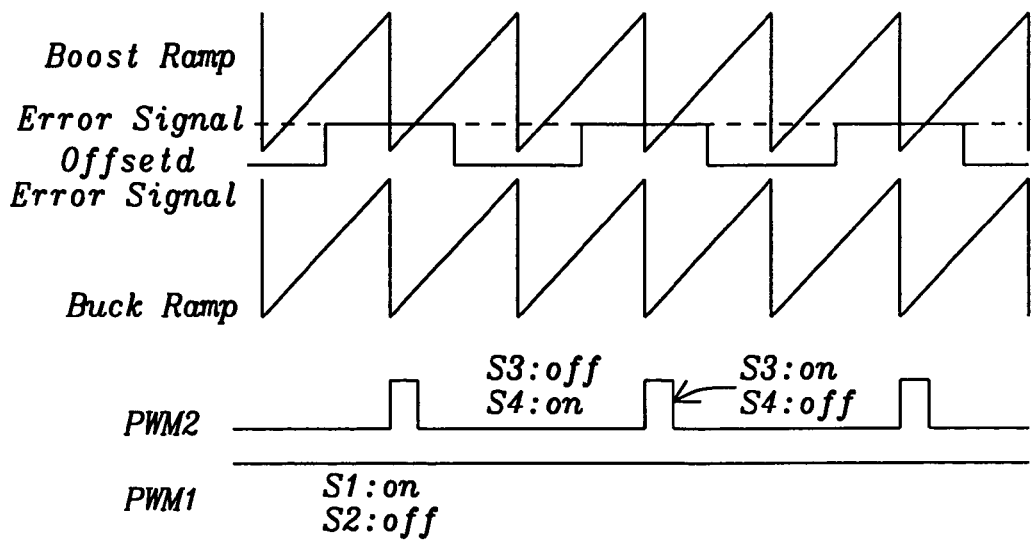

When the error signal gets higher than defined for the buck-boost mode, the converter goes into the half frequency boost mode as illustrated in FIG. 5d. At this error signal voltage, the boost signal is actually generated without offset and no boost pulse is generated with the negative offset present. If the boost pulse is generated, the negative offset is applied and neither the buck nor the boost pulse is generated in the next cycle. If the pulse is skipped, the negative offset is removed, and the boost pulse will be generated in the next cycle. This way a half frequency boost PWM signal is generated.

Figure 5E:
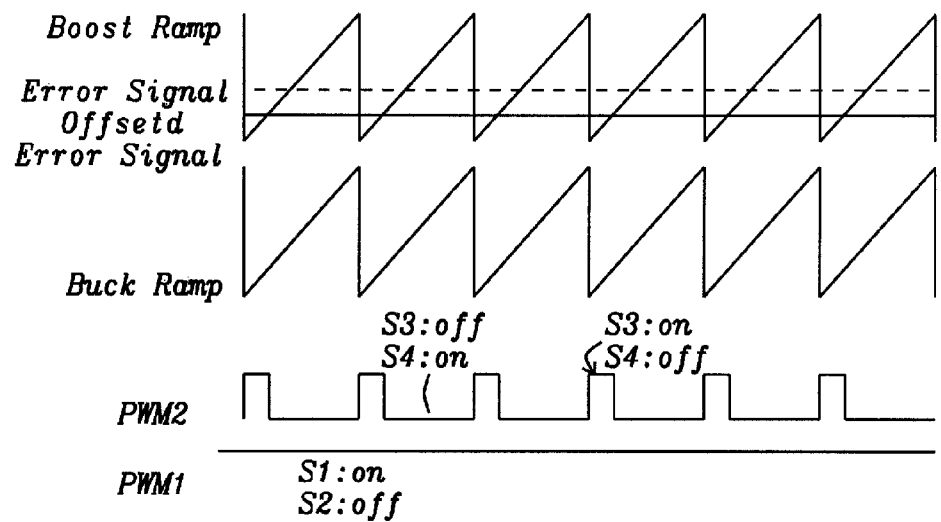

When the error signal gets higher than defined for the half frequency boost mode, the converter goes into the boost mode as illustrated in FIG. 5e. At this error signal voltage, the boost signal is generated with the negative offset only. Therefore, the boost pulse is generated exclusively and the converter operates a boost converter with full frequency.

The error amplifier, the PWM comparators, and ramp signals are mandatory for the PWM control. In this invention, only by adding of simple offset circuits, which can apply positive and negative offset voltages, five different buck-boost operation modes and smooth change between them can be achieved. Furthermore, the switching frequency is halved in half frequency mode, in buck-boost mode, and in half frequency boost mode. This improves efficiency at light load condition without any negative side effect.

Figure 5F:
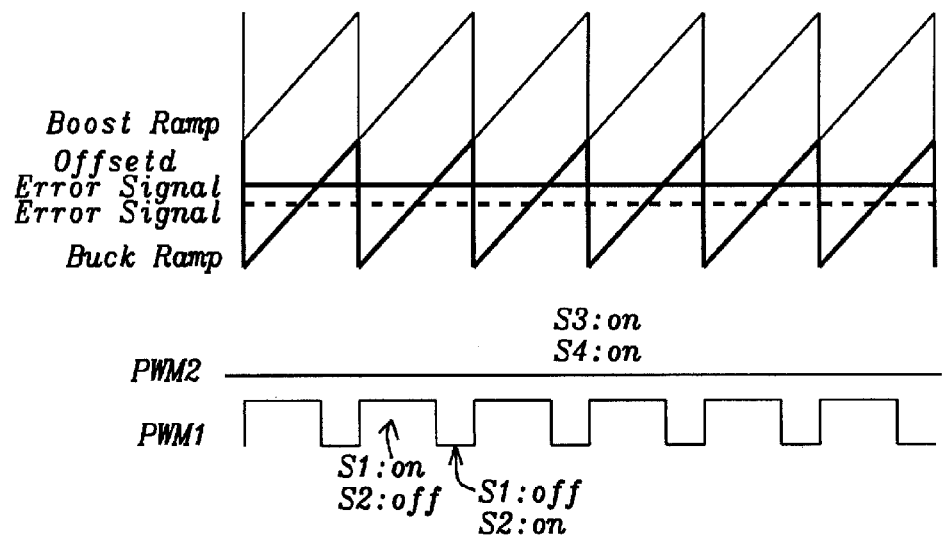
Figure 5G:
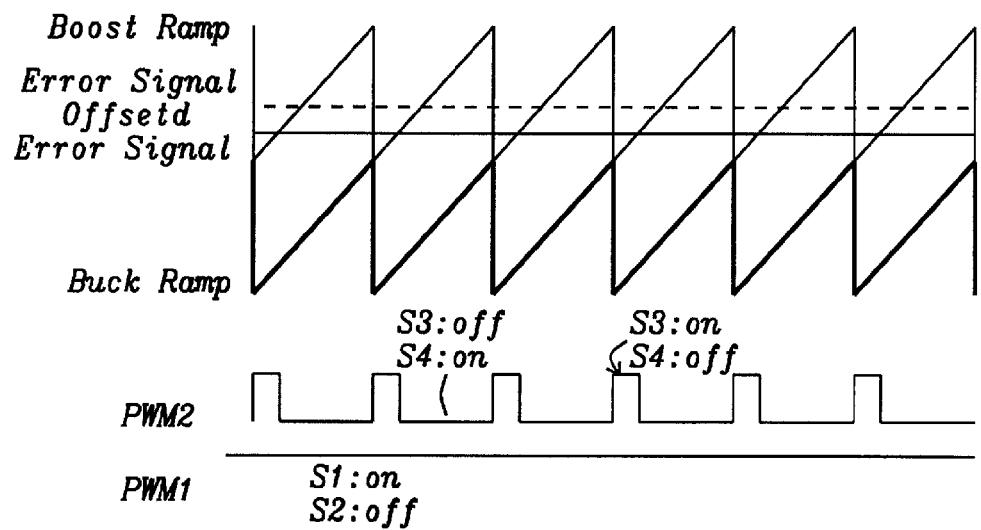
Figure 5H:
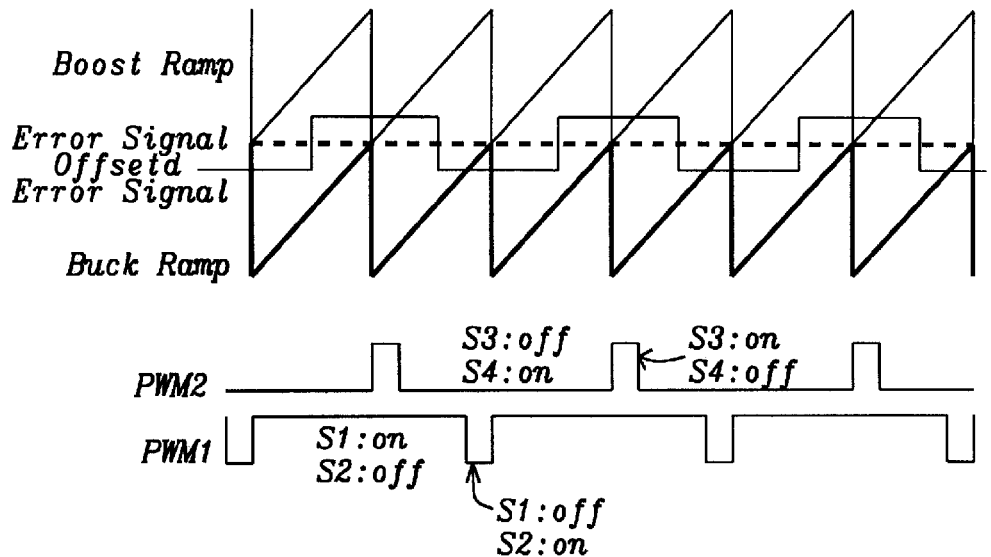

It should be noted that alternatively in another embodiment, according to the control architecture of the present invention a buck-boost converter having three modes could also be implemented, i.e. having buck and boost mode with full frequency and buck-boost mode with halved frequency. Such an operation could also be done with the architecture of the present invention. This operation can be done by two ramp signal relative position. If boost ramp signal bottom and buck ramp signal top are set to same voltage (no gap between two ramp signals, a buck and boost mode with full frequency and buck-boost mode with halved frequency can be achieved. FIG. 5f shows the waveforms of the buck mode, wherein the boost ramp signal bottom and buck ramp signal top are set to same voltage (no gap between two ramp signals). FIG. 5g shows the waveforms of the boost mode, wherein the boost ramp signal bottom and buck ramp signal top are set to same voltage (no gap between two ramp signals). FIG. 5h shows the waveforms of the half-frequency buck-boost mode, wherein the boost ramp signal bottom and buck ramp signal top are set to same voltage (no gap between two ramp signals).

Figure 6:
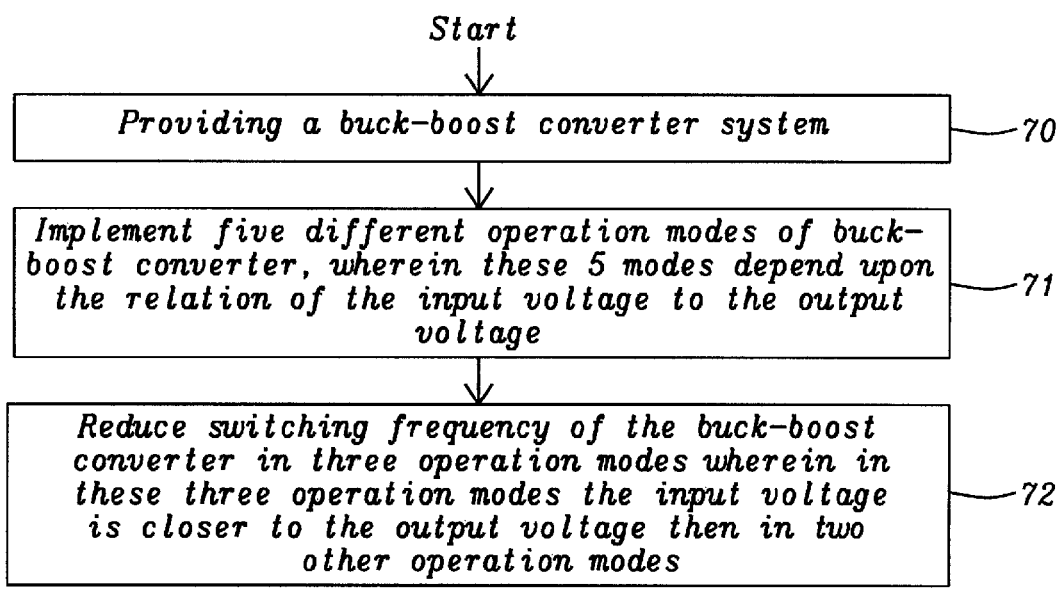
FIG. 6 illustrates a flowchart of a method invented to provide a buck-boost converter system with improved efficiency.

FIG. 6 illustrates a flowchart of a method invented to provide a buck-boost converter with an improved efficiency.

Step 70 of the method of FIG. 6 illustrates the provision of a PWM buck-boost converter system. Step 71 depicts implementing five different operation modes of the buck-boost converter, wherein each of these 5 modes depends upon a dedicated relation of the input voltage to the output voltage. In a preferred embodiment of the invention these five modes are buck mode, half frequency buck mode, buck-boost mode, half frequency boost mode, and boost mode. Step 72 describes reducing switching frequency of the buck-boost converter in three operation modes wherein in these three operation modes the input voltage is closer to the output voltage than in other operation modes. In a preferred embodiment of the invention the switching frequency in half frequency buck mode, in buck-boost mode, and in half frequency boost mode is halved compared to the frequency used in buck or boost mode.

While the invention has been particularly shown and described with reference to the preferred embodiments thereof, it will be understood by those skilled in the art that various changes in form and details may be made without departing from the spirit and scope of the invention.

What is claimed is:

1. A method to achieve a buck-boost converter system having an improved efficiency, comprising the following steps:
   (1) providing a buck-boost converter system comprising two PWM comparators, an error amplifier, wherein an output of the error amplifier depends on a difference between a reference voltage and an output voltage of the buck-boost converter, and a control circuit comprising the error amplifier and a logic circuitry controlling an offset voltage circuitry;
   (2) implementing five different operation modes of the buck-boost converter, wherein each of these five operation modes depends upon a dedicated relation of the input voltage to the output voltage, wherein said five operation modes comprise full frequency buck mode, half frequency buck mode, half-frequency buck-boost mode, half frequency boost mode, and full frequency boost mode; and
   (3) reducing switching frequency of the buck-boost converter in three operation modes wherein in these three operation modes the input voltage is closer to the output voltage than in the other operation modes using the offset voltage circuitry, wherein the offset voltage circuitry provides positive, zero, or negative offset voltage which is added to the output voltage of the error amplifier, wherein the offset voltage is solely dependent on the operation mode selected.

2. The method of claim 1 wherein the buck-boost converter operates using four switches.

3. The method of claim 1 wherein in buck and half frequency buck mode a third switch is continuously OFF and a fourth switch is continuously ON, thus creating a buck converter topology.

4. The method of claim 3 wherein a first and a second switch switches in half frequency in half frequency buck mode compared to a switching frequency used in buck mode or boost mode.

5. The method of claim 1 wherein in buck-boost mode a first pair of a first and a second switch and a second pair of a third and a fourth switch are both switching with different PWM signals.

6. The method of claim 5 wherein the switching frequency in half frequency buck-boost mode is half of the switching frequency used in buck mode.

7. The method of claim 1 wherein in boost mode and in half frequency boost mode a second switch is continuously OFF and a first switch is continuously ON, thus creating a boost converter topology.

8. The method of claim 7 wherein a third and a fourth switch switches in half frequency boost mode compared to a switching frequency used in buck mode or boost mode.

9. The method of claim 1 wherein in buck mode and in boost mode a same switching frequency is used.

10. The method of claim 1 wherein a first PWM comparator is a buck PWM comparator.

11. The method of claim 1 wherein a second PWM comparator is a boost PWM comparator.

12. The method of claim 1 wherein said offset voltages are applied as follows:
    when a first PWM comparator output signal has a pulse then a positive offset voltage is applied to an error signal in a next cycle;
    when the first PWM comparator output signal has no pulse during one cycle then a positive offset voltage is removed in the next cycle;
    when a second PWM comparator output signal has a pulse then a negative offset voltage is applied to an error signal in a next cycle; and
    when the second PWM comparator output signal has no pulse during one cycle then a negative offset voltage is removed in the next cycle.

13. The method of claim 1 wherein in half frequency buck mode, if a buck pulse is generated, the positive offset voltage is applied and the next buck pulse is skipped in the next cycle and, if a buck pulse is skipped, the positive offset is removed and the buck pulse is generated in the next cycle.

14. The method of claim 1 wherein in half frequency boost mode, if a boost pulse is generated, the negative offset voltage is applied and a next boost pulse is generated in the next cycle and, if the next boost pulse is skipped in the next cycle, the negative offset is removed and the boost pulse is generated in the next cycle.

15. The method of claim 1 wherein in buck-boost mode, if a buck pulse is generated, the positive offset voltage is applied and the boost pulse is generated in the next cycle and if a boost pulse is generated, the negative offset is applied and the buck pulse is generated in the next cycle.

16. A buck-boost converter system having an improved efficiency operation in five different operation modes, comprising:
    a DC voltage source;
    an input capacitor, deployed in parallel to the voltage source;
    four switches and an inductance arranged in a buck-boost topology;
    an output capacitor, deployed in parallel to a load of the buck-boost converter;
    an output port loaded with an output voltage, which is connected to a control circuit of the converter;
    an error amplifier, wherein an output of the error amplifier depends on a difference between a reference voltage and the output voltage of the buck-boost converter;
    said control circuit enabled to control the converter in five different operation modes wherein each of these five operation modes depends upon a dedicated relation of the input voltage to the output voltage and wherein said five operation modes comprise full frequency buck mode, half frequency buck mode, half frequency buck-boost mode, half frequency boost mode, and full frequency boost mode, wherein the control circuit comprises an offset voltage circuitry capable of providing positive, zero, or negative offset voltage which is added to the output voltage of the error amplifier, wherein the offset voltage is solely dependent on the operation mode selected.

17. The buck-boost converter system of claim 16, wherein a first terminal of a first of the four switches is connected to a first terminal of the input capacitor and a second terminal of the first switch is connected to a first terminal of a second of the four switches and to a first terminal of the inductance, a second terminal of the second switch is connected to a second terminal of the input capacitor, to a second terminal of a third of the four switches, and to a second terminal of the output capacitor, a second terminal of the inductance is connected to a first terminal of third switch and to a first terminal of a fourth of the four switches, a second terminal of the fourth switch is connected to a first terminal of the output capacitor.

18. The buck-boost converter system of claim 16, wherein the control comprises:
   an error amplifier having inputs and an output, wherein a first input is the output voltage of the converter, a second input is a reference voltage, and the output is a first input to an offset voltage circuitry;
   said offset voltage circuitry having inputs and an output, wherein a second input is a first output of a logic circuit, and the output is a first input to a first PWM comparator and a first input to a second PWM comparator,
   said first PWM comparator, having inputs and an output, wherein a second input is a first ramp signal and the output is a first input of the logic circuit;
   said second PWM comparator, having inputs and an output, wherein a second input is a second ramp signal and the output is a second input of the logic circuit; and
   said logic circuit providing drive signals for said four switches.

19. The buck-boost converter system of claim 18, wherein said offset voltage circuitry is enabled to provide three kinds of offset voltage, namely a positive offset, zero offset, and a negative offset.

20. The buck-boost converter system of claim 19, wherein said offset voltage circuitry comprises
   a first current source, connected to a first terminal of a first resistive means and to a first terminal of a first switch;
   a second current source, connected to a second terminal of a second resistive means and to a first terminal of a third switch;
   said first resistive means having a second terminal connected to the input of the offset voltage circuitry, to a first terminal of a second switch, and to a first terminal of the second resistive means;
   said second resistive means;
   said first switch, wherein its second terminal is connected to the output of the offset voltage circuitry, to a second terminal of the second switch and to a second terminal of the third switch,
   said second switch; and
   said third switch.

21. The buck-boost converter system of claim 19, wherein said offset voltage circuitry comprises
   a first current source connected to a first terminal of a first switch;
   said first switch wherein its second terminal is connected to the input of the offset voltage circuitry, to a first terminal of a resistive means, and to a first terminal of a second switch;
   said second switch wherein its second terminal is connected to a second current source;
   said second current source;
   a third current source connected to a first terminal of a third switch;
   said third switch wherein its second terminal is connected to the output of the offset voltage circuitry, to a second terminal of the resistive means, and to a first terminal of a fourth switch;
   said fourth switch wherein its second terminal is connected to a fourth current source; and
   said fourth current source.

22. A method to achieve a buck-boost converter system having an improved efficiency, comprising the following steps:
   (1) providing a buck-boost converter system comprising two PWM comparators and a control circuit comprising an error amplifier and a logic circuitry controlling an offset voltage circuitry;
   (2) implementing three different operation modes of the buck-boost converter, wherein each of these three operation modes depends upon a dedicated relation of the input voltage to the output voltage and wherein said three modes comprise buck and boost mode with full frequency, and buck-boost mode with half frequency wherein the offset voltage circuitry provides positive, zero, or negative offset voltage which is added to an output voltage of the error amplifier, wherein the offset voltage is solely dependent on the operation mode selected.

23. The method of claim 22 wherein the half buck-boost frequency mode is achieved by setting a bottom boost ramp signal and a top buck ramp signal to same voltage and without gap between the two ramp signals.

24. The method of claim 22 wherein the three modes are implementd by setting a bottom boost ramp signal and a top buck ramp signal to same voltage and without gap between the two ramp signals.

* * * * *